United States Patent
Bartley et al.

(10) Patent No.: US 7,447,619 B2
(45) Date of Patent: Nov. 4, 2008

(54) APPARATUS AND METHOD FOR COMPOSITE BEHAVIORAL MODELING FOR MULTIPLE-SOURCED INTEGRATED CIRCUITS

(75) Inventors: Gerald Keith Bartley, Rochester, MN (US); Richard Boyd Ericson, Rochester, MN (US); Wesley David Martin, Elgin, MN (US); Benjamin William Mashak, Rochester, MN (US); Trevor Joseph Timpane, Rochester, MN (US); Ay Vang, Vadnais Heights, MN (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 11/239,600

(22) Filed: Sep. 29, 2005

(65) Prior Publication Data

US 2007/0073529 A1    Mar. 29, 2007

(51) Int. Cl.
*G06F 17/50* (2006.01)
*G06F 17/10* (2006.01)

(52) U.S. Cl. .................. 703/14; 703/2; 703/6; 703/17; 716/5; 716/17

(58) Field of Classification Search ............... 703/17, 703/18, 19, 2, 14; 716/5, 17
See application file for complete search history.

(56) References Cited

U.S. PATENT DOCUMENTS

| | | | |
|---|---|---|---|
| 6,088,739 A * | 7/2000 | Pugh et al. | 719/315 |
| 6,263,302 B1 * | 7/2001 | Hellestrand et al. | 703/17 |
| 6,408,428 B1 * | 6/2002 | Schlansker et al. | 716/17 |
| 7,093,165 B2 * | 8/2006 | Kageshima | 714/34 |
| 2002/0019969 A1 * | 2/2002 | Hellestrand et al. | 716/5 |
| 2005/0114105 A1 * | 5/2005 | Barber | 703/2 |

* cited by examiner

*Primary Examiner*—Thai Phan
(74) *Attorney, Agent, or Firm*—Martin & Associates LLC; Bret J. Petersen

(57) ABSTRACT

An apparatus and method for simulation and testing of electronic systems using a single model that has the composite behavioral information of multiple parts. The single model allows the designer to simulate using one model that captures the anticipated extremes (best case behavior to worst case behavior) across a collection of devices from different vendors.

16 Claims, 4 Drawing Sheets

APPARATUS AND METHOD FOR COMPOSITE BEHAVIORAL MODELING FOR MULTIPLE-SOURCED INTEGRATED CIRCUITS

BACKGROUND OF THE INVENTION

1. Technical Field

This invention generally relates to modeling integrated circuits, and more specifically relates to apparatus and methods for composite behavior modeling for specification-based, multiple-sourced integrated circuits.

2. Background Art

Today's integrated circuit (IC) systems are often a highly complex combination of hardware and software that must function within very specific constraints in order for the computer system to operate as designed. Computer aided design tools allow IC designers to model a new design and to model how the new design will interact with and respond to existing systems or components prior to production. Modeling with computer aided design tools can significantly accelerate the design process and reduce the time to market for IC systems, which can be a competitive advantage.

Simulation has long been a preferred method for verification of correctness of complex electronic circuit board designs. Simulation is broadly defined as the creation of a model which, if subjected to arbitrary stimuli, responds in a similar way to the manufactured and tested design. The simulation model is used by an electrical design simulator executing on a computer workstation. Simulation saves a significant amount of time and financial resources because it enables designers to detect design errors before the expensive manufacturing process is undertaken.

Integrated Circuits are typically designed to meet a certain industry specification or standard. The various suppliers design their ICs to meet the industry standard but the suppliers are free to use their own circuit design methods to design the I/O (Input/Output) buffers. Therefore, each supplier's model for their I/O buffer will display different behaviors and ultimately, each supplier's device will act differently in the final product. In the simulation process for a circuit board that uses this type of industry specification based devices, a single supplier's model is often used in the simulation. However, there may be multiple approved suppliers on the designer's approved suppliers list. In order to validate the design for all the possible suppliers parts, all of the models should be gathered from the approved suppliers and simulated in the design prior to building the package, card, application, or system. However, this often is not done because it takes so much time to test each suppliers separate model across process, voltage, temperature extremes in the design. Without a way to simulate different suppliers models in a design simulation in an efficient manner, the integrated circuit industry will continue to suffer from inefficiency and poor simulation performance.

DISCLOSURE OF INVENTION

In accordance with the preferred embodiments, an apparatus and method provide a single model that has the composite behavioral information of all of the supplier's model's behavior. This allows the designer to simulate using one model that captures the anticipated extremes (best case behavior to worst case behavior) across a collection of devices from different vendors. In preferred embodiments, a behavioral description of a device is obtained through testing an I/O model to get tables of data such as IV (current/voltage) relationships, and VT (Voltage/Time) relationships of the pullup and pulldown transistors.

In other embodiments, each supplier's model is simulated (strong/best case, typical case, and weak/worst case) into a test load and output behavior could be compared visually by viewing the output on a plot or automatically through a waveform comparison script to determine which supplier's device behavior is best, worst, or most typical.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments herein provide an apparatus and method for simulation and testing of electronic systems using a single model that has the composite behavioral information of multiple devices. The single model allows the designer to simulate using one model that captures the anticipated extremes (best case behavior to worst case behavior) across a collection of devices from different vendors.

Figure 1:
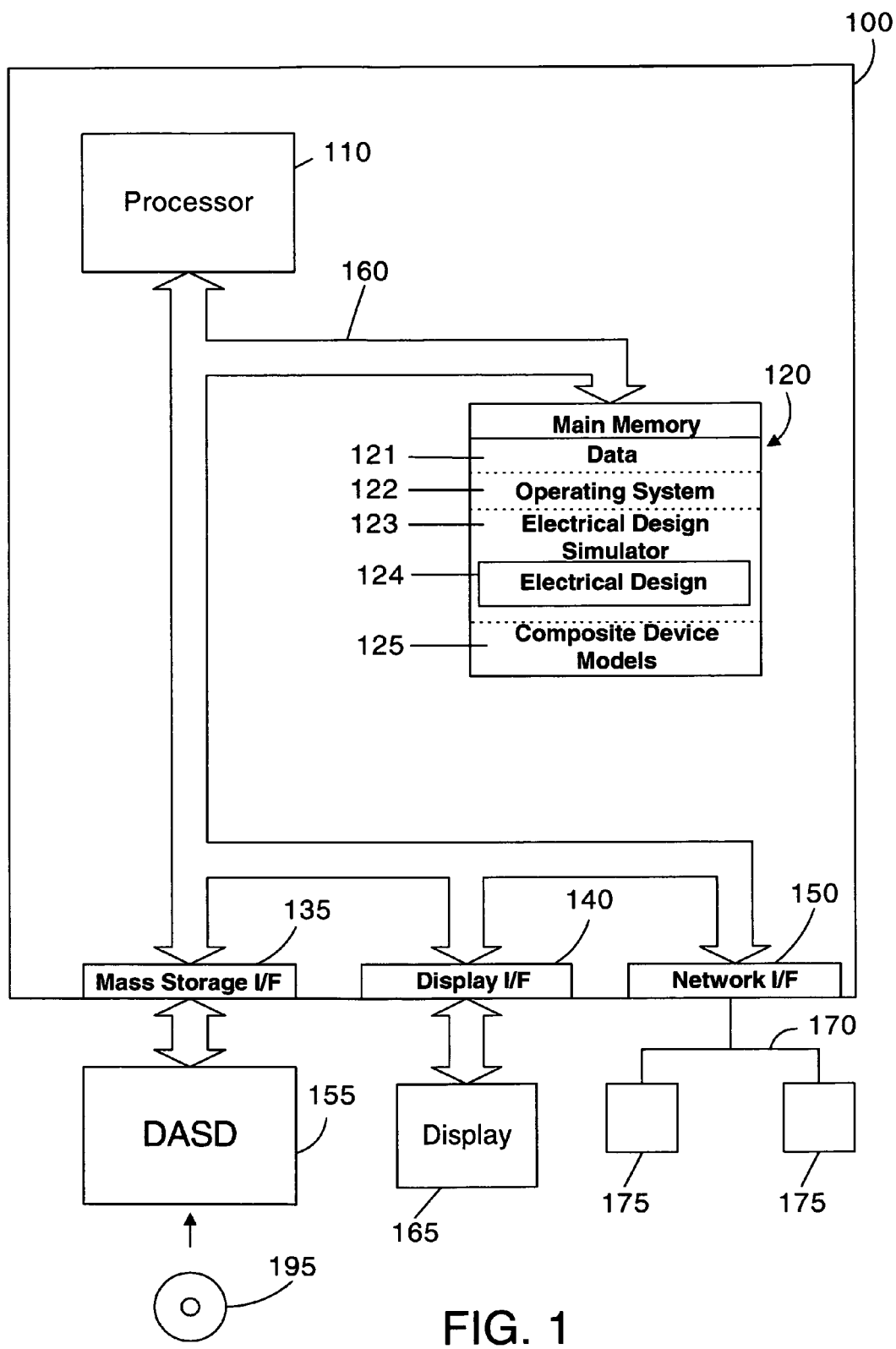
FIG. 1 is an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 135, a display interface 140, and a network interface 150. These system components are interconnected through the use of a system bus 160. Mass storage interface 135 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, an Electrical design simulator 123, an electrical design 124, and one or more composite device models 125. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Electrical design simulator 123 is any suitable simulator, whether currently known or developed in the future. The electrical design 124 is a design of an electrical system represented in a suitable format for simulation such as a hardware description language. The Electrical design simulator 123 uses the composite models 125 (described further below) to validate the electrical design 124.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, Electrical design simulator 123, electrical design 124, and the composite device models 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 135, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links. Note that the preferred signal bearing media is tangible.

Figure 2:
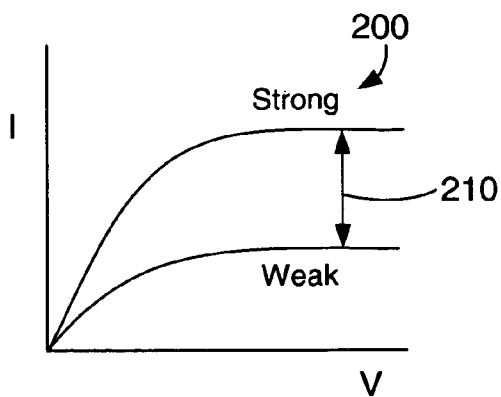
FIG. 2 is an example of an IV curve for a simulation model according to the prior art.
Figure 3:
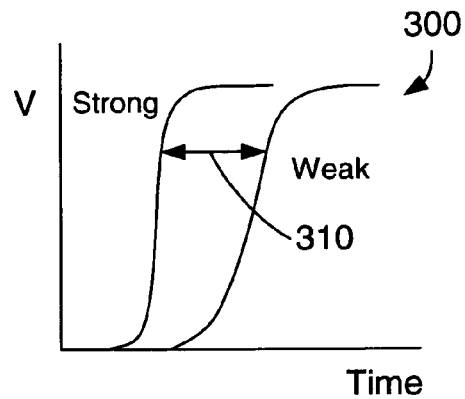
FIG. 3 is an example of an VT curve for a simulation model according to the prior art.

The preferred embodiments herein provide an apparatus and method for simulation and testing of electronic systems using a single composite behavior model that captures the anticipated extremes of device models across a collection of ICs designed and manufactured by different vendors. Integrated Circuits are typically designed to meet a certain industry specification or standard. The various suppliers design their ICs to meet the industry standard but the suppliers are free to use their own circuit design methods. For example, the vendors are free to design the I/O (Input/Output) buffers. Therefore, each supplier's model for their I/O buffer will display different behaviors and ultimately, each supplier's device will act differently in the final product. FIGS. 2 and 3 show the design characteristics for typical prior art IV (current/voltage) 200 and VT (voltage/time) 300 specification curves. The specification envelope 210, 310 that must be met by the part vendors is between the strong and weak curves shown in FIGS. 2 and 3.

Figure 4:
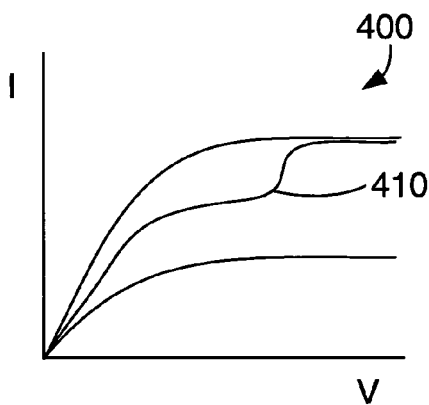
FIG. 4 is an example of an IV curve for an actual output driver.
Figure 5:
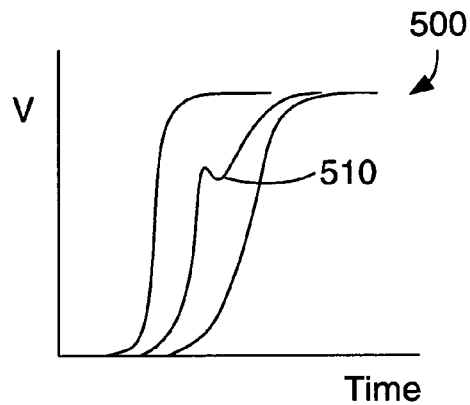
FIG. 5 is an example of an VT curve for an actual output driver.

FIGS. 4 and 5 illustrate behavioral descriptions 400, 500 from I/O models provided by a specific device vendor along with the specification limits shown in FIGS. 2 and 3. In this case, the behavior descriptions for the I/O models from this vendor illustrate a device model characteristic that lies within the specification limits, but has properties that may cause problems in the circuit design. Specifically, the IV and VT curves include a "shoulder" 410, 510 area of the curve. In preferred embodiments, these unusual characteristics of some models can be included in the composite model to insure these potential problem areas are accounted for in the simulation testing process.

Figure 6:
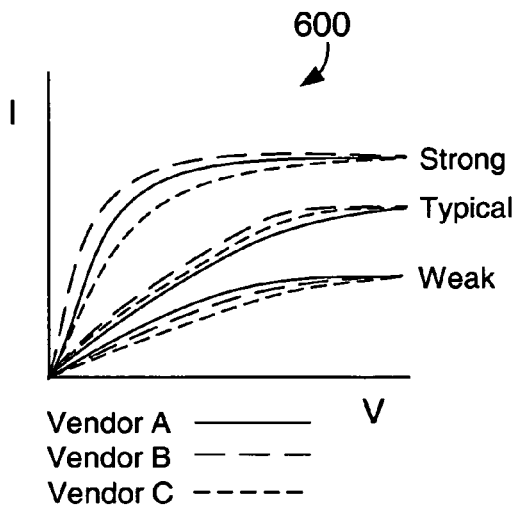
FIG. 6 illustrates IV curves for several vendor device models used to construct a composite model according to preferred embodiments.
Figure 7:
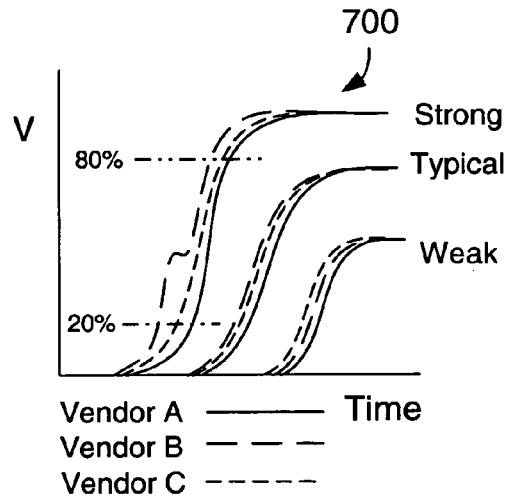
FIG. 7 illustrates VT curves for several vendor device models used to construct a composite model according to preferred embodiments.

FIGS. 6 and 7 illustrate several device behavioral description curves 600, 700 that are used to construct a composite model according to preferred embodiments herein. FIG. 6 shows IV relationships and FIG. 7 shows VT relationships that are used to describe the I/O of the output drivers for a typical IC. In each figure, a device from 3 different vendors or manufacturer is represented (Vendor A, Vendor B, and Vendor C). Each vendor's device is represented by a "Strong", "Typical" and "Weak" curve. Each of these behavioral description curves 600, 700 are derived from device models provided by the vendor.

A behavioral description of a device as shown in FIGS. 6 and 7 can be derived through testing an input/output (I/O) model provided by the vendor to get curves as shown or tables of data. Typically a device model is provided by the vendor as an H-Spice or Spector transistor level model, or an IBIS file (I/O Buffer Information System file). Each vendor's model would be simulated (strong/best case, typical case, and weak/worst case) into a test load to create the device behavioral descriptions 600, 700 as shown in FIGS. 6 and 7.

The device behavioral descriptions 600, 700 could be compared visually by viewing the output on a plot as shown in FIGS. 6 and 7, or they could be compared automatically through a waveform comparison script or some other computer analysis tool to determine which supplier's device behavior is best, worst, or most typical. The selection of the best, worst case or typical is made from the various vendor models that will provide the best composite model to insure that simulation testing with the composite model will test the electronic design over the possible variations for any of the vendor's devices. Thus, the composite model contains device behavioral descriptions derived from device models from one or more vendors.

A composite model according to the preferred embodiments and as described herein can be constructed for many different output parameters or other characteristics of an electronic device. A few specific examples are described below but it is expressly recognized that other similar composite models could be used similarly and are included within the scope of the claimed invention.

EXAMPLE 1

Suppose output impedance is chosen as the desired composite characteristic, then from the I/V table shown in FIG. 6, the strong (fast/best) case could be selected from Vendor B's data for having the lowest impedance (driving more current). The typical case could be chosen from Vendor C's data since it is between the Vendor A and Vendor B data. The weak (slow/worst) case could be selected from Vendor C's data for having the highest impedance (driving the least current). The following composite model could then be created:

|  | Strong | Typical | Weak |
| --- | --- | --- | --- |
| composite_impedance_<model_type> | Vendor B | Vendor C | Vendor C |

EXAMPLE 2

Suppose output rise time is chosen as the desired composite characteristic, then from the Voltage/Time curves in FIG. 7, the strong case for rise time would be chosen from Vendor A's data. Vendor A's data is chosen for the strong case because it exhibits the fastest 20% to 80% rise time, meaning the fastest time for the output voltage to rise from the 20% level to the 80% level as shown in FIG. 7. The typical case would be chosen from Vendor C's data. The weak case for rise time would be chosen from Vendor A's data for having the slowest rise time. The following composite model could then be created:

|  | Strong | Typical | Weak |
| --- | --- | --- | --- |
| composite_risetime_<model_type> | Vendor A | Vendor C | Vendor A |

EXAMPLE 3

Suppose some nonlinear behavior has been noticed in some of the vendor's models. It might be desirable to select the most extreme cases of the nonlinear behavior into a composite model. In the example shown in FIG. 7, the Vendor B strong data shows a definite shoulder which reduces the overall rise-time and this nonlinear behavior could have an effect on the circuit it is placed in. A composite model could be created using voltage-time data that is unusual as follows:

|  | Strong | Typical | Weak |
| --- | --- | --- | --- |
| composite_unusual vt_<model_type> | Vendor B | Vendor C | Vendor A |

Figure 8:
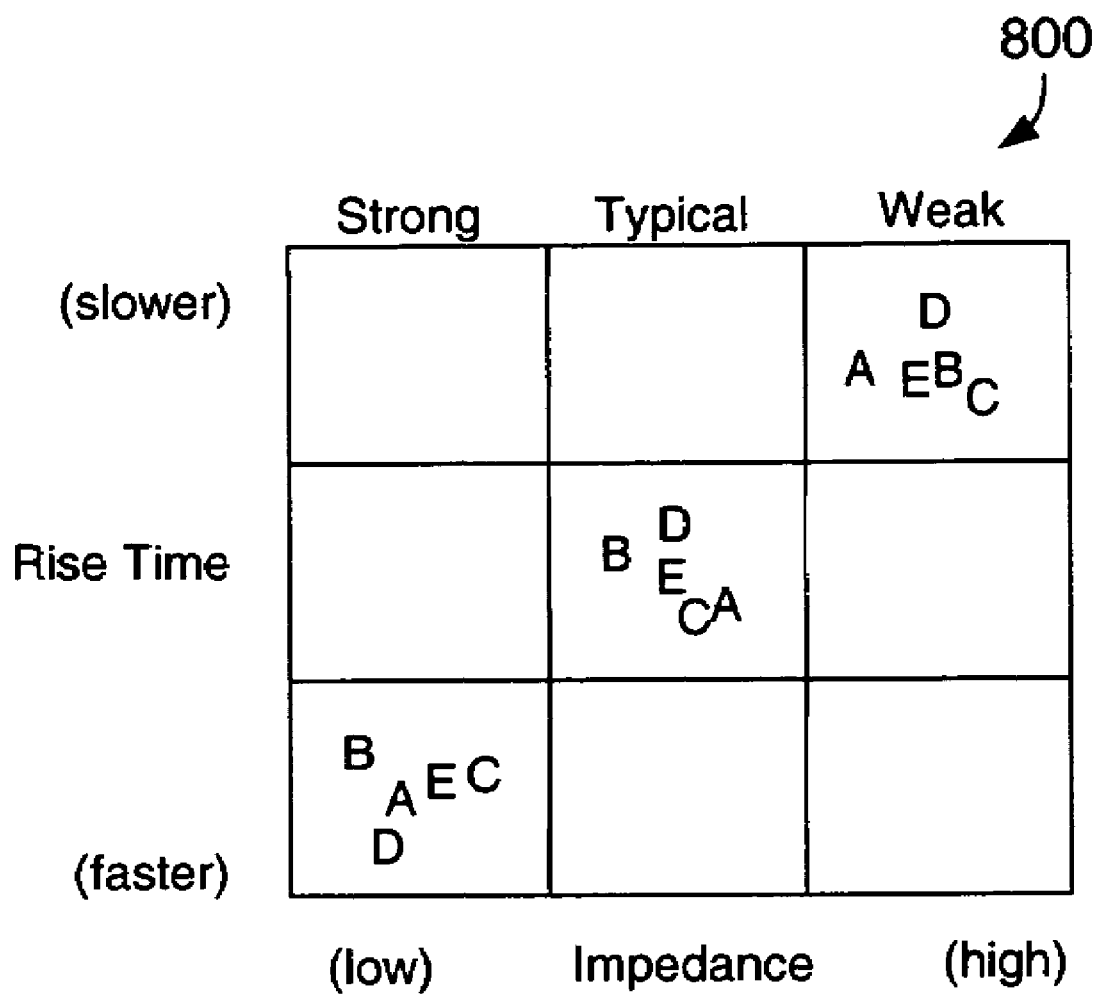
FIG. 8 illustrates a plot of device behavior characteristics for several vendor device models according to preferred embodiments.

FIG. 8 illustrates another way to analyze the information using a table with scatter plots of the different vendor's device characteristics. The data for two characteristics that might be important for a design (in this example rise time and output impedance) are mapped out in a strong/typical/weak table as shown in FIG. 8 and used to identify a composite model in the same manner as described above.

As additional vendor data is collected, the need for an additional composite model might become apparent and a new composite model can be added as described above. If a new vendor device is added and it matches closely to a previous vendor's data, then a determination can easily be made that the newly approved manufacturer's device should work in the system and the composite model need not be updated.

Figure 9:
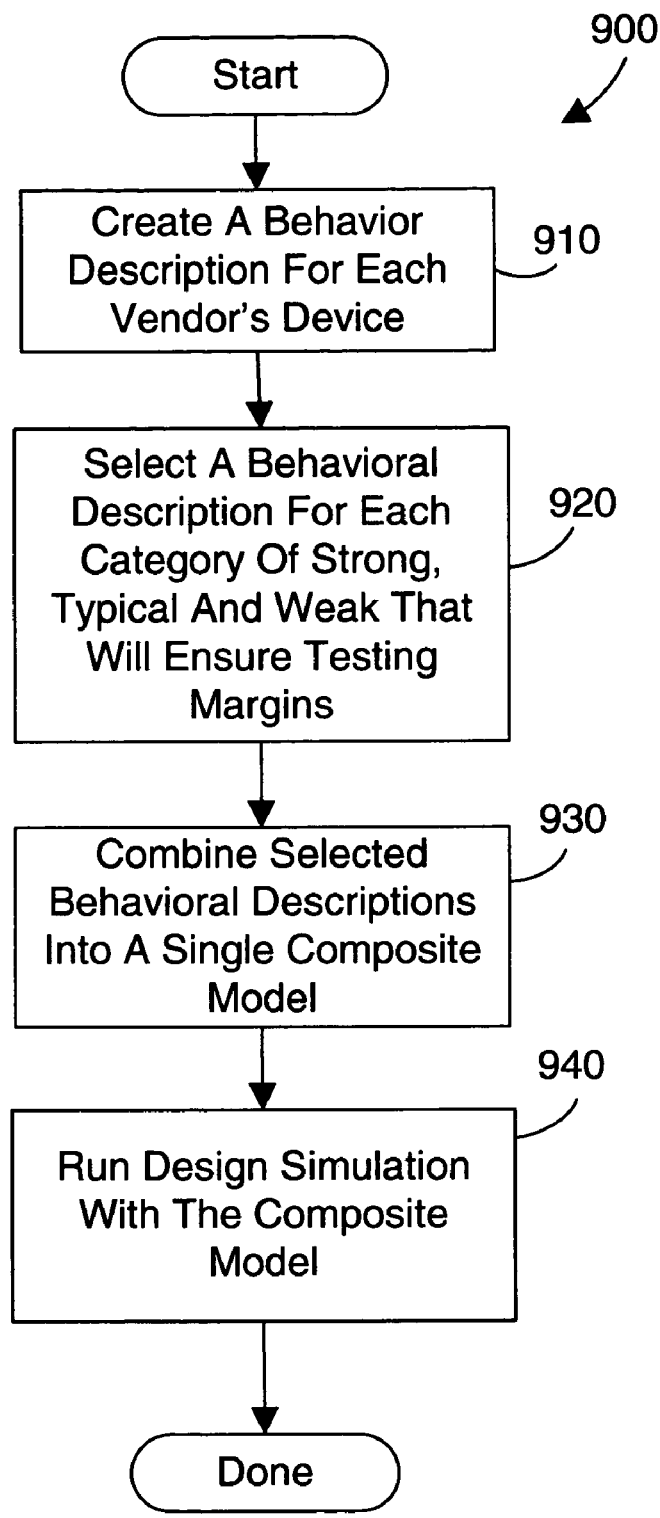
FIG. 9 is an example flow diagram illustrating a method according to the preferred embodiments.

Referring now to FIG. 9, a flow diagram shows a method 900 for simulating an electronic design using a composite device model according to preferred embodiments. The method first creates a behavior description for each vendor's device (step 910) using device models provided by the vendor as described above. The behavioral descriptions are then analyzed and the behavioral descriptions that will best ensure testing at the margins are selected (step 920). The selected behavioral descriptions are then combined into a single composite model (step 930). The composite model is then used in a typical simulation environment to test and verify the electronic design (step 940).

The present invention as described with reference to the preferred embodiments provides significant improvements over the prior art. An apparatus and method provide for simulation and testing of electronic systems using a single model that has the composite behavioral information of multiple devices from different vendors. The present invention provides a way to improve simulation efficiency by simulating using one model that captures the anticipated extremes across a collection of devices from different vendors.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   an electrical design simulator and an electrical design residing in the memory; and
   a composite device model residing in the memory that is used by the electrical design simulator to simulate the electrical design, wherein the composite device model is a single behavioral model for a device in the electrical design that contains device behavioral characteristics that includes marginal characteristics chosen from a plurality of device models for the device from different vendors of the device.

2. The apparatus of claim 1 wherein the behavioral characteristics are input/output characteristics of electronic devices provided by the different vendors.

3. The apparatus of claim 2 wherein the input/output characteristics are chosen from the following: current/voltage and voltage/time.

4. The apparatus of claim 1 wherein the composite device model includes unusual behavioral characteristics of one or more electronic devices.

5. The apparatus of claim 1 wherein the composite device model includes unusual behavioral characteristics of one or more electronic devices where the unusual behavior characteristics lie within the specification limits for the device but may cause problems in circuit designs using the device.

6. A method for simulating an electrical system design, the method comprising the steps of:
   creating a behavioral description for a plurality of device models for a device from different vendors;
   selecting a behavioral description for each of a plurality of categories that ensure a single composite model for the device will include marginal characteristics; and
   combining the selected behavioral descriptions into the single composite device model.

7. The method of claim 6 wherein the composite device model contains device behavioral characteristics chosen from a plurality of device models from different vendors of the same device.

8. The method of claim 7 wherein the behavioral characteristics are input/output characteristics for the device provided by the different vendors.

9. The method of claim 8 wherein the input/output characteristics are chosen from the following: current/voltage and voltage/time.

10. The method of claim 6 further comprising the step of simulating an electronic design with the composite device.

11. The method of claim 6 wherein the composite device model includes unusual behavioral characteristics of one or more electronic devices where the unusual behavior characteristics lie within the specification limits for the device but may cause problems in circuit designs using the device.

12. A program product comprising:
   (A) a composite device model used by an electrical design simulator to simulate an electrical design stored in memory, wherein the composite device model is a single behavioral model for a device in the electrical design that contains device behavioral characteristics that includes marginal characteristics chosen from a plurality of device models for the device from different vendors of the device; and
   (B) computer-recordable media bearing the composite device model.

13. The program product of claim 12 wherein the behavioral characteristics are input/output characteristics for the device provided by the different vendors.

14. The program product of claim 13 wherein the input/output characteristics are chosen from the following: current/voltage and voltage/time.

15. The program product of claim 12 wherein the composite device model includes unusual behavioral characteristics of one or more electronic devices.

16. The program product of claim 12 wherein the composite device model includes unusual behavioral characteristics of one or more electronic devices where the unusual behavior characteristics lie within the specification limits for the device but may cause problems in circuit designs using the device.

* * * * *